March 8, 1966 A. E. WEIDNER ETAL 3,238,827
ACCELERATING DEVICE FOR TRAVELING SECONDARY MACHINING DIES
Filed Sept. 2, 1964 2 Sheets-Sheet 2
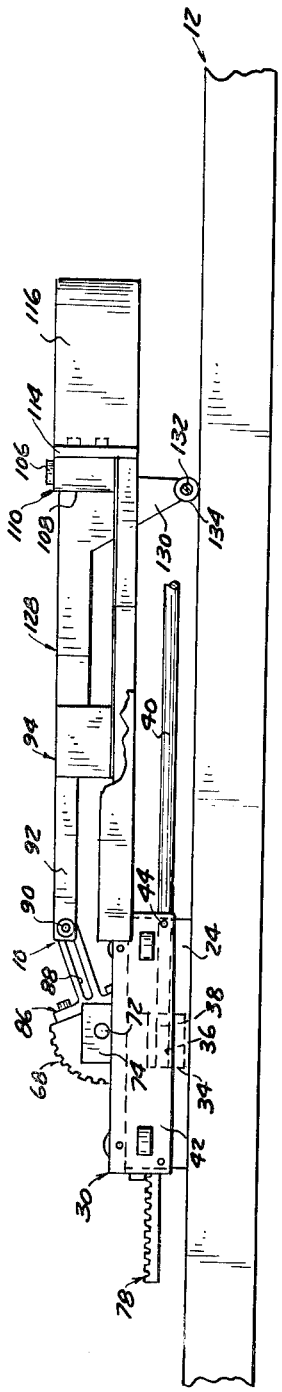
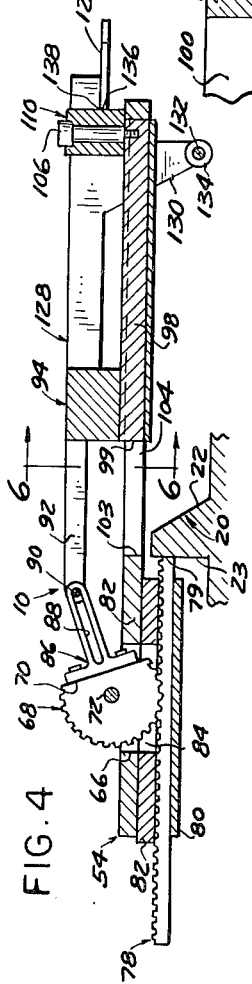
INVENTORS.
ARTHUR E. WEIDNER.
HENRY C. SISKA.
BY Barthel & Bugbee
ATTORNEYS

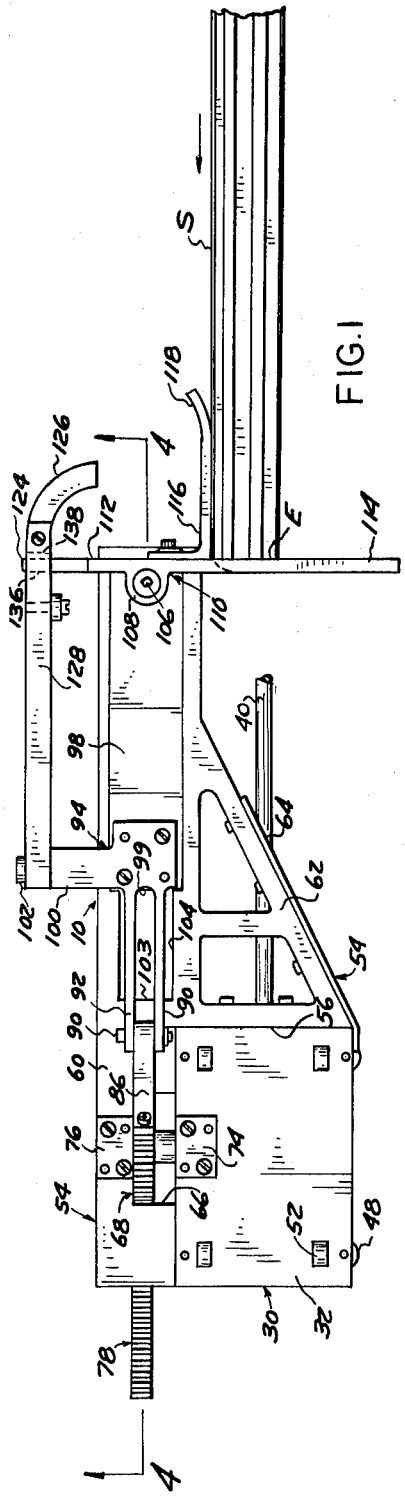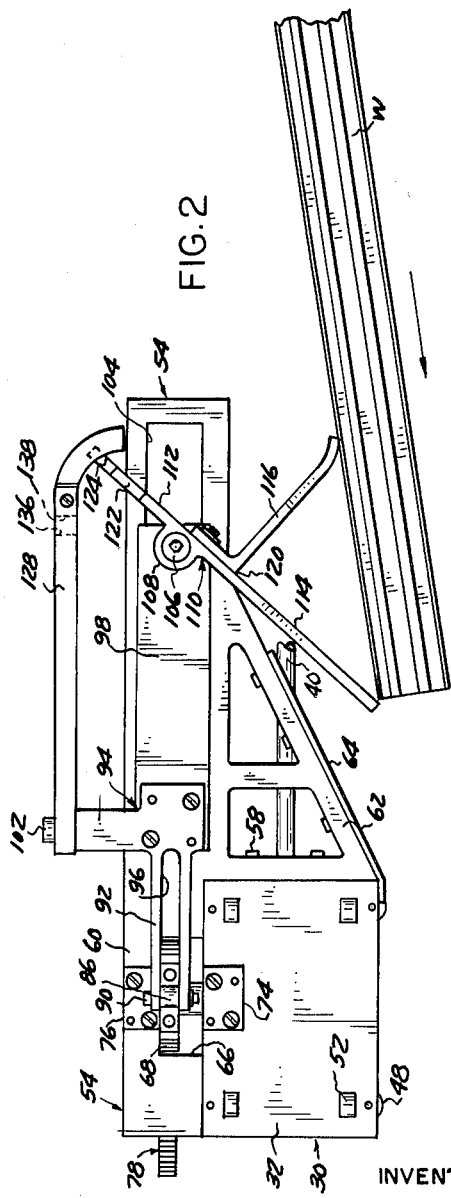

United States Patent Office 3,238,827
Patented Mar. 8, 1966

3,238,827
ACCELERATING DEVICE FOR TRAVELING
SECONDARY MACHINING DIES
Arthur E. Weidner, Elmore, and Henry C. Siska, Oak Harbor, Ohio, assignors to Formetal, Inc., Oak Harbor, Ohio, a corporation of Ohio
Filed Sept. 2, 1964, Ser. No. 393,880
12 Claims. (Cl. 83—159)

This invention relates to secondary cut-off dies and, in particular, to traveling secondary machining dies.

Hitherto, traveling secondary machining dies, such as cut-off dies, have been used for the purpose of punching, piercing, upsetting or cutting off elongated members such as rolled sections upon their emergence from a primary work-processing machine, such as a rolling machine which imparts travel motion thereto. Previously, the traveling secondary machining die has been set in motion by the impact of the primarily-machined member with the gauge bar which determines where the secondary operation such as cut-off takes place. As many workpieces are of soft metal, such as aluminum, they are deformed and thereby rendered inaccurate by their impact with the gauge bar.

Heretofore, in the effort to avoid distortion or deformation of the workpiece by its impact with the gauge bar, the secondary machining die, such as a cut-off die, has been set in motion by means of an air cylinder, electrical solenoid, or a spring-loaded motive mechanism. These die-moving devices, however, complicate the primary work-processing machine and require accurate timing mechanism in order that the die will start moving at the proper instant and not too early or too late. The present invention eliminates these disadvantages of prior arrangements by starting the secondary machining die to move gently and to gradually accelerate its speed until it is ultimately traveling at the same speed as the workpiece at the time the secondary machining die is caused to perform its function of punching, piercing, upsetting or cut-off upon the workpiece.

Accordingly, one object of this invention is to provide a traveling secondary machining die accelerating device in which the workpiece sets the die in motion from a dead stop by applying an impact force which is so slight as to be insufficient to damage the workpiece yet which causes the die speed to be gradually accelerated until it is traveling at substantially the same speed as the workpiece, before the secondary operation die, such as a cut-off die, is caused to operate, thereby eliminating damage to the workpiece and greatly enhancing the precision of dimensions of the workpiece to be held within closer tolerances than have hitherto been practical.

Another object is to provide a secondary machining die accelerating device of the foregoing character wherein the gradual acceleration with initially low force and ultimately high force is accomplished by means of a gear rack meshing with a gear which is rotated by a lever arm on which the point of application of the force is initially at a maximum distance from the axis of rotation of the gear upon impact of the workpiece but which moves steadily toward that axis of rotation to shorten the lever arm and thus increase the speed of rotation of the gear as the application of the force to the lever arm continues.

Another object is to provide a secondary machining die accelerating device of the foregoing character wherein the device automatically ejects the workpiece immediately after the traveling secondary machining die has performed its operation, whereupon the traveling secondary machining die is immediately and automatically returned to its starting position, ready for a repetition of its operating cycle.

In the following description, the present invention is disclosed, for purposes of illustration but not limitation, as applied to a traveling cut-off die, but it will be evident to those skilled in the metal-working art that the invention can be used to move other secondary machining dies, such as piercing dies, upsetting dies or other dies working in cooperation with any type of machine which imparts travel motion to the workpiece.

Other objects and advantages of the invention will become apparent during the course of the following description of the accompanying drawings, wherein:

FIGURE 1 is a top plan view of a traveling cut-off die accelerating device, according to one form of the invention, with the moving parts shown in their relative positions at the instant of initial impact of the workpiece with the device, but with the run out table omitted in order to disclose parts which would otherwise be concealed by it;

FIGURE 2 is a view similar to FIGURE 1, but with the parts in their relative positions immediately after cut-off, with the workpiece being automatically ejected;

FIGURE 3 is a side elevation of the cut-off die accelerating device shown in FIGURE 1, with the workpiece omitted, and with the run out table only partially and diagrammatically shown;

FIGURE 4 is a longitudinal vertical section taken along the line 4—4 in FIGURE 1;

FIGURE 5 is a left-hand end elevation of the device shown in FIGURES 1 and 3, with the run out table included; and FIGURE 6 is an enlarged fragmentary vertical cross-section taken along the line 6—6 in FIGURE 4.

Referring to the drawings in detail, FIGURES 1 to 5 inclusive show a travelling cut-off die accelerating device, generally designated 10, according to one form of the invention, as mounted for travel longitudinally back and forth along an elongated run out table, generally designated 12 (FIGURE 5) which is stationarily mounted and preferably connected at its right-hand end (FIGURE 3) to the roll-forming machine (not shown). The run out table 12 may be of any suitable form, the form shown (FIGURE 5) being an elongated inverted channel member 14 with downwardly-extending flanges 16 and having a web 18. Bolted or otherwise secured to the channel member 14 is a fixed cam 20 having on its rearward side an upwardly and forwardly inclined cam surface 22 and on its forward side (FIGURE 4) a fixed abutment surface 23. Bolted or otherwise secured to the top of the web 18 are two T-section guide bars 24 mounted in spaced parallel relationship with upper flanges 26 overhanging their body portions 28.

Mounted for reciprocating travel back and forth along and upon the guide bars 24 is a carriage, generally designated 30, which transports the mechanism of the die accelerating device 10. Bolted or otherwise secured to the underside of the top or web 32 of the carriage 30 and extending downwardly therefrom into the space between the guide bars 24 is a connection block 34 (FIGURE 5) of inverted T-shaped cross-section drilled and threaded centrally as at 36 to receive the correspondingly-threaded forward end 38 of a connecting rod 40, the opposite or rearward end (not shown) being connected to a conventional flying or travelling cut-off die (also not shown) likewise mounted for reciprocating travel along the guide bars 24 of the run out table 12. Such travelling cut-off dies are well-known to those skilled in the metal-working industry and their details are beyond the scope of the present invention.

The carriage 30 is of inverted channel cross-section with opposite side portions or skirts 42 depending from the top or web 32 thereof. The side portions 42 are drilled horizontally and perpendicularly at their opposite corners to receive axle pins 44 rotatably supporting lower vertical rollers 46 (FIGURE 5) bearing against the underside of the top flanges 26 of the guide bars 24 so as to exercise a holddown action upon the carriage 30. The skirts or side portions 42 adjacent the axle pins 44 are slotted and drilled vertically into the slots to receive vertical axle pins 46 rotatably supporting horizontal side rollers 48 which bear against the outer sides of the top flanges 26 of the guide bars 24. Finally, the top 32 of the carriage 30 is slotted and drilled horizontally into the slots to receive horizontal axle pins 50 which rotatably support upper vertical rollers 52. These rest upon the upper surfaces of the guide bars 24 and roll therealong to slidably support the carriage 30.

Bolted or otherwise secured to the left-hand side and rearward end of the carriage 30 (FIGURE 5) is a base plate, generally designated 54, having an L-shaped cut-out portion 56 in its forward end receiving the carriage 30 and secured to the sides of the base 32 by bolts 58 (FIGURES 1 and 2). The base plate 54 includes an approximately rectangular side portion 60 and an approximately triangular end portion 62 secured respectively to one side and the rearward end of the carriage 30. A tie bar 64 is bolted or otherwise secured to the outer edge of the triangular portion 62 and to the outer or right-hand side of the carriage 30 and acts as a work guide.

The side portion 60 adjacent the carriage 30 is provided with a rectangular opening 66 (FIGURES 1, 2 and 4) within which is mounted a gear 68, one side of which is cut away along a chord to provide a flat surface 70. The gear 68 is mounted upon a shaft 72 which in turn is rotatably supported in bearing blocks 74 and 76 bolted or other wise secured to the tops of the carriage 30 and base plate 54 on opposite sides of the opening 66. The gear 68 meshes with a toothed rack 78 which in its starting position has its rearward end 79 engaging the abutment surface 23 as a thrust surface (FIGURE 4). The rack 78 is slidably and reciprocably mounted in a logitudinally grooved block 80 which in turn is bolted or otherwise secured to the underside of the base plate 54. Bearing bars 82 are mounted in the upper portion of the upwardly-facing groove 84 (FIGURE 5) of the block 80 to close the groove 84 and are bolted or pinned in place.

Bolted or otherwise secured to the flat chordal surface 70 of the gear 68 is a T-shaped crank arm 86 which is provided with a radial slot 88, the longitudinal axis of which intersects the axis of rotation of the gear 68 and its supporting shaft 72 (FIGURE 4). Extending through and slidably engaging the slot 88 is a cross pin 90 mounted at its opposite ends in the forward end of the slotted arm 92 of an L-shaped member 94, the slot 96 of which receives the crank arm 86. The L-shaped member 94 is bolted or otherwise secured to an elongated slide block 98 and has its remaining arm 100 projecting laterally perpendicular to the slotted arm 92 and carrying a horizontal pivot bolt 102. The slide block 98 has a forward end 99 and slides to and fro into and out of engagement with the farward end abutment or stop surface 103 of an elongated slot 104 in the base plate 54 and has upper and lower flanges 105 and 107 (FIGURE 6) overhanging the edges of the slot 104 for guidance and retention therein. Mounted in the slide block 98 nears its rearward end is a vertical pivot bolt 106 which pivotally supports the hub 108 of a push plate 110 having latching and work-contacting portions 112 and 114 respectively extending in opposite direction from the hub 108. Bolted or otherwise secured to the push plate 110 near the hub 108 thereof is an L-shaped or angle work ejector plate 116 having a curved end 118 for deflecting the end E of the workpiece W into the right-angled pocket 120 between the members 114 and 116 (FIGURES 1 and 2). The latching portion 112 is provided with a downwardly-inclined portion 122 terminating in a nose portion 124 which projects outwardly or laterally beneath an arcuate guide bar 126. The latter is bolted or otherwise secured to and beneath the rearward end of a vertically-swinging latching lever 128, the forward end of which is pivotally mounted on the pivot bolt 102 secured to L-shaped member 94.

Extending downwardly from the rearward end of the latching lever 128 is a cam follower arm 130 carrying the axle screw 132 of a cam follower roller 134. The cam follower roller 134, which will be seen in the discussion of the operation of the invention, rolls up the inclined cam surface 22 of the fixed cam 20 swing the latch lever 128 upward when the carriage 30 reaches its maximum forward position (FIGURE 2) so as to lift a locking notch 136 on the underside of the latching lever 128 near the rearward edge of the cam follower arm 130 out of latching engagement with the nose portion 124 of the latching portion 112 of the push plate 110. The rearward edge of the notch 136 is formed by the rearward end 138 of the guidebar 126 (FIGURES 1 and 2).

In the operation of the invention, let it be assumed that the travelling cut-off die accelerating device 10 has been retracted to its starting position shown in FIGURES 1, 3 and 4, and that the roll-forming machine has rolled out an elongated strip or bar S which is to be precisely cut into sections of accurate length to form workpieces W (FIGURE 2). As the rolled strip or bar S runs out from the roll-forming machine (not shown) beyond the right-hand side of FIGURE 1, its forward end encounters the work-contacting portion 114 of the push plate 110 and pushes it to the left at a gradually accelerated speed (FIGURES 3 and 4). As a consequence, the slide block 98 upon which the push plate 110 is mounted by means of the bolt 106 is likewise pushed to the left along the guideway slot 104 in which it is mounted, at a gradually accelerated speed and, being comparatively light in weight, initially offers little resistance to the rapidly moving roll strip or bar S. It consequently does not deform or otherwise damage the end E thereof.

The travel of the slide block 98 and its slotted arm 92 together with the cross pin 90 causes the latter to slide along the now slightly inclined slot 88 in the T-shaped crank arm 86, swinging the latter upward from a standstill and consequently starting the gear 68 to rotate at a gradually accelerated speed of rotation. This rotation is transmitted through the teeth of the gear 68 to the teeth of the rack 78, the end 79 of which is temporarily stationary against the thrust surface 23 of the fixed cam 20 (FIGURE 4). As a result, the carriage 30 upon which the shaft 72 is mounted in the bearing blocks 74 and 76 also starts to move from a standstill position at a gradually accelerated speed, which increases as the cross pin 90 moves down the radial slot 88 and thereby shortens the radius of the decreasing crank arm formed between the axis of the cross pin 90 and the axis of the gear shaft 72.

The carriage 30 through its connection 34 (FIGURE 5) with the connecting rod 40 extending rearwardly to the traveling cut-off die also starts the cut-off die moving from a standstill position with a gradually accelerated rate of speed. This speed has gradually increased from the initial contact of the strip or bar end E with the push plate 110 and reaches its maximum when the slotted crank arm 86 reaches the vertical position shown in FIGURE 2, so that the cut-off die or other secondary machining die is now moving at its maximum speed. The cut-off die is then actuated by suitable conventional means, such as by a limit switch operatin ga solenoidal valve which in turn actuates a hydraulic cylinder to operate the cut-off die and sever the workpiece E from the rolled strip or bar S.

Meanwhile, when the slotted crank arm 86 has reached a nearly vertical position and the gear 68 has reached the end of its rotation, the gear 68 ceases to drive the rack 78. The end of the rack 68 then pulls away from its engagement with the abutment surface 23 and travels with the carriage 30, which it continues to do until the cut-off die or other secondary operation die performs its function and the workpiece is ejected as described below.

At the instant of cut-off or other secondary traveling die operation, the cam follower roller 134 on the depending arm 130 reaches and climbs up the inclined fixed cam surface 22 (FIGURE 4), thereby swinging the latching lever 128 upward in a counterclockwise direction around its pivot bolt 102. This action in turn lifts the rearward end of the latching lever 128 and its latching notch 136 off the nose portion 124 of the push plate arm 112, freeing it to swing clockwise around its pivot bolt 106 from the position perpendicular to the direction of travel of the rolled strip or bar S (FIGURE 1) to the oblique position of FIGURE 2, impelled by the momentum of the severed workpiece W. The same action swings the work ejector plate 116 in a counterclockwise direction, whereupon the end of the ejector plate 116 pushes the severed workpiece W sidewise and the guide bar 64 deflects it onto a suitable receiver, such as a conveyor belt or receiving hopper, as shown in FIGURE 2. Immediately thereafter, the carriage 30 is returned to its starting position shown in FIGURES 1, 3 and 4, by retracting springs (not shown), whereupon the push plate 110 swings back to its perpendicular position of FIGURE 1, with its nose portion 124 locked in the latching notch 136, ready for the next cycle of cut-off operations. As the carriage 30 is thus retracted the traveling cut-off or other secondary machining die (not shown) is also pushed back to its starting position by the connecting rod 40. The slotted crank 86 remains in a nearly vertical position during the retraction stroke of the carriage 30 until the end of the rack 78 engages the abutment surface 23 and halts. The continuing motion of the carriage 30 for a short distance causes the gear 68 to roll along the now stationary rack 78, swinging the slotted crank 86 back to its nearly horizontal position.

For subsequent cycles of operation the above action then repeats itself as the next succeeding link of the rolled strip or bar S engages the push plate 110, starting a new cycle of secondary machining die operations in the manner described above.

What we claim is:

1. An accelerating device for a traveling secondary machining die for elongated workpieces emerging from a primary work-processing machine imparting travel motion thereto, said device comprising
    an elongated guideway alined with the path of travel of the elongated workpieces to be secondarily machined,
    a carriage structure mounted for travel along said guideway between starting and secondary machining positions respectively, a stationary thrust abutment fixedly mounted adjacent said guideway near the starting position of said carriage structure,
    a toothed rack reciprocably mounted on said carriage structure and engageable with said thrust abutment at said starting position of said carriage structure,
    a gear in mesh with said rack rotatably mounted on said carriage structure,
    a slide movably mounted on said carriage structure for reciprocation relatively thereto along a path of travel parallel to the path of travel of said carriage structure along said guideway,
    rectilinear-to-rotary motion-transmitting and converting mechanism mounted on said slide in sliding driving engagement with said gear,
    a stop on said carriage structure engageable by said slide at a predetermined location in its travel thereon for propelling said carriage structure,
    a work-contacting member mounted on said slide in the path of travel of the work to be secondarily machined,
    and means connected to said carriage structure for coupling said carriage structure to the traveling secondary machining die.

2. An accelerating device, according to claim 1, wherein said motion-transmitting and converting mechanism includes a crank member connected to said gear and a motion-transmitting arm connected to said slide.

3. An accelerating device, according to claim 2, wherein said crank member has an approximately radial guide therealong and wherein said motion-transmitting arm slidably engages said guide.

4. An accelerating device, according to claim 3, wherein said guide comprises an elongated approximately radial slot in said crank member and wherein said motion-transmitting arm carries a cross pin extending through said slot in sliding engagement therewith.

5. An accelerating device, according to claim 1, wherein said work-contacting member is pivotally mounted on said slide, wherein a latch releasably holds said work-contacting member approximately transverse to its path of travel, and wherein there is provided means responsive to the travel of said carriage structure to a predetermined position along said guideway for releasing said latch and thereby effecting tilting of said work-contacting member into work-ejecting position.

6. An accelerating device, according to claim 5, wherein said means includes a cam element mounted at said predetermined position and a latch-releasing member on said slide engageable with said cam element.

7. An accelerating device, according to claim 6, wherein said latch-releasing member is pivoted to said slide and has a cam-engaging element mounted thereon in a path of interception of said cam.

8. An accelerating device, according to claim 5, wherein a work ejector is mounted on and projects from said work-contacting member.

9. An accelerating device, according to claim 8, wherein said work ejector includes an ejecting member disposed approximately perpendicular to said work-contacting member.

10. An accelerating device, according to claim 1, wherein said guideway includes an elongated rail of T-shaped cross-section and wherein said carriage structure slidably engages said rail and has hold-down rollers thereon engaging said rail beneath the top thereof.

11. An accelerating device, according to claim 10, wherein said carriage structure also has contact rollers rotatably mounted thereon in rolling engagement with the upper surface of said rail.

12. An accelerating device, according to claim 1, wherein said guideway includes a pair of elongated rails disposed in spaced parallel relationship and wherein said coupling means is connected to said carriage structure between said rails and extends longitudinally therealong within the space between said rails.

No references cited.

WILLIAM W. DYER, JR., *Primary Examiner.*

L. B. TAYLOR, *Assistant Examiner.*